United States Patent

Guissin et al.

[11] Patent Number: 5,909,302
[45] Date of Patent: Jun. 1, 1999

[54] STARING SCANNER

[76] Inventors: Rami Guissin, 18 Hatzouk Street, Moshav Beit Yanai, Israel, 40293; Abraham Reichert, 1 Shkolnik Aaron Street, Rehovot, Israel, 76209

[21] Appl. No.: 08/903,651

[22] Filed: Jul. 31, 1997

[30] Foreign Application Priority Data

Aug. 2, 1996 [IL] Israel .......................................... 118997

[51] Int. Cl.⁶ .................................................. G02B 26/08
[52] U.S. Cl. ......................... 359/225; 359/198; 359/212; 359/215; 359/223; 359/226; 250/234
[58] Field of Search .................... 359/196–199, 359/212–215, 223, 225, 226, 220–221; 347/256–260; 358/474, 296; 250/234–236

[56] References Cited

U.S. PATENT DOCUMENTS

| | | |
|---|---|---|
| 3,222,453 | 12/1965 | Whitesell et al. . |
| 3,468,229 | 9/1969 | Bellows . |
| 4,155,620 | 5/1979 | Rawson . |
| 4,283,145 | 8/1981 | Miyazawa ............................... 356/364 |
| 4,410,233 | 10/1983 | Gerhardt et al. . |
| 4,482,902 | 11/1984 | Bailey et al. . |
| 4,511,205 | 4/1985 | Crane . |
| 4,553,028 | 11/1985 | Reust ...................................... 250/201 |
| 4,658,140 | 4/1987 | Roll et al. ............................... 250/347 |
| 4,725,127 | 2/1988 | Malinge et al. . |
| 4,764,002 | 8/1988 | Wilson . |
| 4,919,499 | 4/1990 | Aiba . |
| 4,962,986 | 10/1990 | Hompel et al. . |
| 5,058,968 | 10/1991 | Stark ........................................ 359/213 |
| 5,066,083 | 11/1991 | Makino et al. .......................... 359/213 |
| 5,153,767 | 10/1992 | Makino .................................... 359/206 |
| 5,247,384 | 9/1993 | Inoue et al. ............................. 359/199 |
| 5,285,307 | 2/1994 | Pekar et al. ............................. 359/201 |
| 5,386,312 | 1/1995 | Spencer ................................... 359/215 |
| 5,416,609 | 5/1995 | Matsuda et al. ........................ 358/474 |

OTHER PUBLICATIONS

Minolta Brochure: DPCS 3000 Digital Publication Copying System, Minolta Corporation, Document Imaging Systems Division, 101 Williams Drive, Ramsey, N.J. 07446, U.S.A., 1995. (No Month).

*Primary Examiner*—James Phan
*Attorney, Agent, or Firm*—Ladas & Parry

[57] ABSTRACT

An optical scanning apparatus and method for scanning objects, including a focusing lens defining an optical axis and a focal plane, a pivot axis, a scanning mirror defining a scanning mirror plane and located between the focusing lens and the focal plane, wherein the scanning mirror is disposed parallel to the pivot axis and is rotatably attached thereto, a detector located on a detector axis and wherein the detector axis is located between the focusing lens and the scanning mirror, and a mirror motion imparting device operative to translate the mirror such that the pivot axis is translated along a path parallel to the focal plane and to rotate the scanning mirror about the pivot axis as the pivot axis is translated such that the mirror plane at the pivot axis maintains substantial perpendicularity to the detector axis, thereby to scan an object.

10 Claims, 5 Drawing Sheets

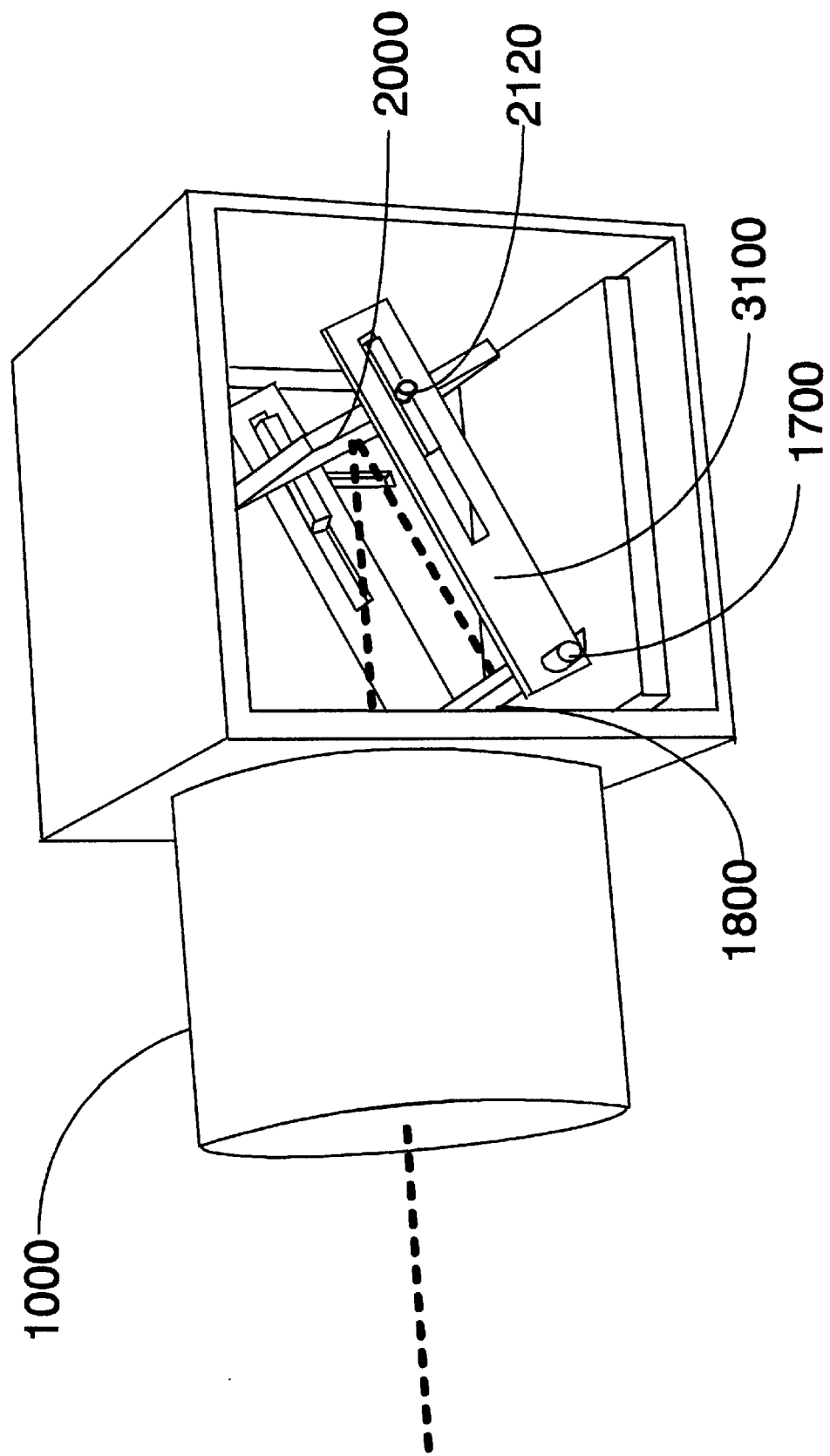

STARING SCANNER

FIELD OF THE INVENTION

The present invention relates to apparatus and methods for optical scanning.

BACKGROUND OF THE INVENTION

Optical scanning systems incorporating scanning mirrors are generally classified into two categories, namely scanners in which the scanning mirror is located between the imaging lens and the object plane, and scanners in which the scanning mirror is located between the imaging lens and its focal plane.

Scanning systems of the first category are generally regarded as more cumbersome as they increase the overall size of the imaging system. Moreover the size of the scanning mirror is determined by the dimensions of the imaging lens aperture and the scanning geometry. In some applications such as the scanning of flat documents, it is necessary to maintain focus over the entire field of view. One such scanning system is described in U.S. Pat. No. 5,058,968 to Stark.

Scanning systems of the second category tend to be more compact as they are designed to operate within the enclosed space of the imaging system. Such systems either translate an imaging detector in the focal plane of the optic such as backplane scanners, or scan the field of view using a mirror situated between the optical lens and the image (focal) plane. One such scanning system is described in U.S. Pat. No. 5,416,609. A commercially available system of this category is the DPCS 3000, marketed by Minolta.

Backplane scanner systems of the second category translate detectors in the focal plane. In order for such systems to achieve acceptable image quality, they are required to maintain a high level of opto-mechanical detector translation stability and accuracies. As a result, such systems are often limited in the scanning rate which can be achieved, and utilize costly translatory scanning and servo means. Mirror scanner systems of the second category such as that described in U.S. Pat. No. 3,468,229 by Bellows, are require complicated scanner designs and implementations.

The disclosures of all publications mentioned in the specification and of the publications cited therein are hereby incorporated by reference.

SUMMARY OF THE INVENTION

The present invention seeks to provide an improved system and methods for optical scanning in which, preferably, a scanning mirror located between the imaging lens and its focal plane scans the imaged field of view across an imaging detector. The scanning mirror pivot axis is preferably translated along an axis approximately perpendicular to the optical axis of the imaging lens, and also simultaneously rotated about the pivot axis such that the mirror at the pivot point maintains perpendicularity with respect to the imaging detector, such as a photosensitive device. The optical scanning system may be configured and arranged to operate within an imaging camera, and preferably provides high resolution two dimensional imaging over the entire field of the view of a standard imaging lens and suitably aligned one dimensional linear CCD detector.

The present invention thus provides a scanning system solution of the second category which is simplified as compared to existing systems, as it provides a combined low cost and high rate scanning method.

There is thus provided in accordance with a preferred embodiment of the present invention optical scanning apparatus employing an oscillating mirror with combined translating and rotating motions, and that is positioned in the optical imaging system between the imaging optics and the imaging plane in such a way as to enable the mapping of the entire optical image plane onto a single axis, and that is moved in such a way as to maintain focus and imaging geometry over the entire field of view of the imaging lens.

The apparatus of the present invention preferably both rotates and translates the scanning mirror. According to one embodiment of the present invention, the motor translates a pivot up and down, in which case rotation is induced by a leader. Alternatively, the motor rotates the leader about an axis, in which case translation of the mirror is induced by the leader.

A preferred feature of the present invention is that the pivot axis translates along a path parallel to the focal plane rather than perpendicular thereto.

Another preferred feature of the present invention is that there exists a location along the axis of rotation such that, for each location within an object to be scanned, there exists a state of the scanning apparatus which is characterized in that, when the scanning apparatus is in that state, the scanning apparatus focuses that object location to that axis location.

BRIEF DESCRIPTION OF THE DRAWINGS

The present invention will be understood and appreciated from the following detailed description, taken in conjunction with the drawings in which:

FIG. 4 is a simplified isometric view of the apparatus of FIGS. 2–3C assembled together with an imaging lens and imaging detector in a camera housing.

DETAILED DESCRIPTION OF PREFERRED EMBODIMENTS

Cost effective high resolution electronic imaging can be achieved by scanning multi element linear CCD detectors, or other one dimensional scanning solutions, in a dimension perpendicular to the dimension along which the detector is aligned.

The problems encountered by such scanning methods include maintaining the geometry of the projected image and maintaining focus throughout the image. A major limitation in existing backplane scanners is that they are required to move the entire detector assembly while maintaining stability and accuracies. Mirror scanning solutions are generally designed suitably per given imaging lens parameters, and often do not generally provide the user with the ability to easily exchange the lens system or the lens parameters such as focal length and field of view.

It is therefore an object of the present invention to provide an improved optical scanning method and apparatus which alleviates the above problems and removes limitations of existing techniques.

The apparatus shown and described herein incorporates a scanning mirror between the imaging lens and its focal plane, which scans the imaged field across an imaging detector, wherein the scanning mirror pivot axis is translated along an axis approximately perpendicular to the optical axis of the imaging lens, and also simultaneously rotated about the pivot axis such that the mirror at the pivot point maintains perpendicularity with respect to the imaging detector.

Figure 1A:
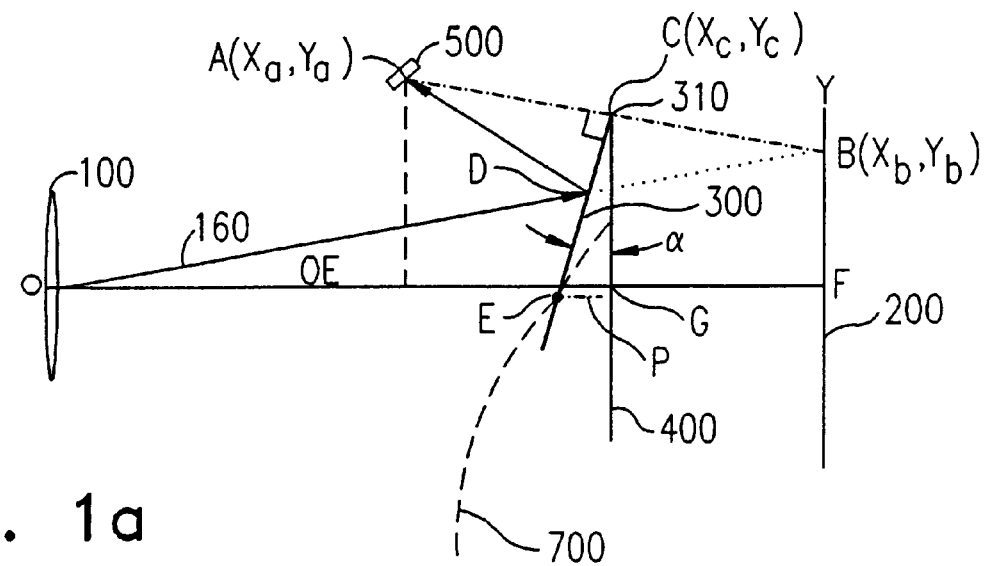
FIGS. 1A–1B are simplified optical diagrams of a scanning method operative in accordance with a preferred embodiment of the present invention.
Figure 1B:
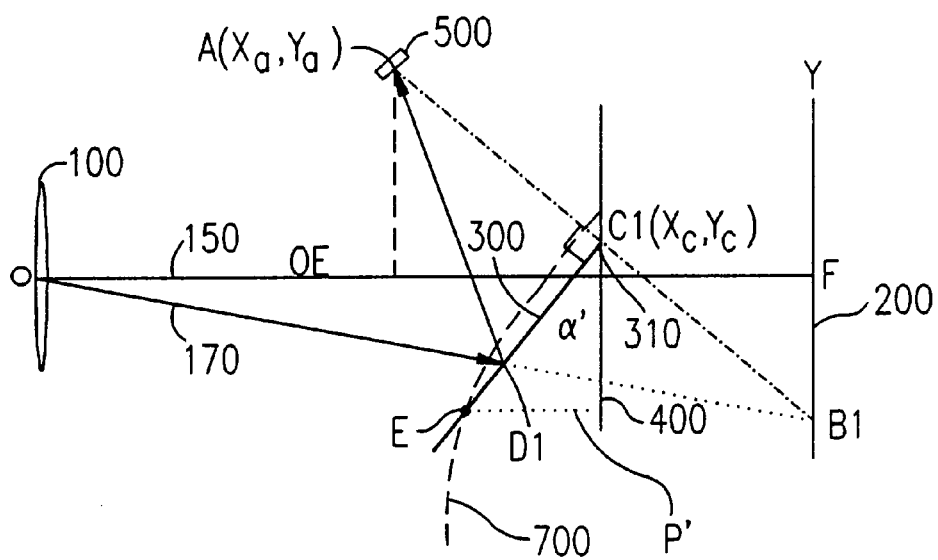

Reference is now made to FIGS. 1A–1B which illustrate a scanning method operative in accordance with a preferred embodiment of the present invention. A lens unit 100 defines the optical axis OE and a focal plane 200. Rays 160 and 170 define the field of view coverage of rays passing through the lens exit pupil center O, and ray 150 is the ray through O directed at the focal point F. A scanning mirror 300 is illustrated in two different discrete scanning positions in FIGS. 1A and 1B respectively. The mirror's pivot axis 310 is confined to scanning plane 400 which is perpendicular to the optical axis OE.

At each position of the scanning mirror, the mirror reflects the rays emanating from point O onto a detector unit 500, such as a photosensitive device, located at position A having coordinates (Xa,Ya).

When the mirror's pivot axis 310 is located at position C1, it reflects ray 170 at position D1 (which otherwise would meet the focal plane 200 at position B1) onto the detector unit 500. Similarly, when the mirror's pivot axis 310 is located at position C having coordinates (Xc,Yc), it reflects ray 160 at position D (which otherwise would meet the focal plane 200 at position B having coordinates (Xb,Yb)) onto the detector unit 500.

According to the method of FIGS. 1A–1B, in order to maintain focus at each scanning mirror position, the respective reflected ray distance from O to A at each scanning position is typically equal to the distance of the respective ray from O to the focal plane 200. For example, at the mirror's pivot position C, reflected ray ODA must equal ray ODB. Since the distance OD is equal for both rays, the distance DB equals DA.

This condition typically holds for every scanning position in the entire field of view. Distance OD is equal for both rays, independently of the focal length of the lens 100. Hence, the lens can be interchanged freely without any alterations in the scanning mechanism.

To achieve the above condition, the scanning plane 400 along which the mirror's pivot axis moves is placed at half the horizontal distance between the detector horizontal position Xa to Xb, the horizontal position of the focal plane 200. At the mirror's pivot position C, an imaginary line CD extends perpendicular to imaginary line AB. Each point along CD is equidistant from A and B, hence DA=DB, and focus is maintained. The line CD defines the scanning mirror plane profile, and the reflection angle ODA is equal to twice the angle OBA. Therefore, a ray 160 emanating from O towards B will be reflected to A.

Preferably, for all scanning positions of the mirror's pivot point along scanning plane 400, the scanning plane 400 is located halfway between A and focal plane 200, and is also parallel to the focal plane, hence it intersects every imaginary line between A and any point along the line BB1. Furthermore, the scanning mirror is maintained perpendicular to these connecting lines at each respective scanning position. Therefore the analysis above for ray OB holds also for ray OB1 at the mirror's pivot position C1, and AD1=D1B1, and the angle <OD1A=<2*OB1A.

The scanning mirror therefore typically incorporates two simultaneous motions, namely a translational motion and a rotational motion. The translational motion of the mirror translates the mirror's pivot point 310 along the scanning plane 400. The rotational (angular) motion of the mirror is about its pivot point such that the mirror is maintained perpendicular to the line connecting A to the corresponding pivot point position.

The scanning mirror's translational position is defined as that of its pivot point, and the mirror's angular position is defined as the angle <α subtended between the mirror profile and the vertical axis (scanning plane 400 and focal plane 200). The mirror's translational and rotational positions throughout the scanning operation are given by the coordinates (Xc,Yc,α) with Xc=constant. Both coordinates Yc and α depend on the corresponding field point Yb being scanned and the detector position coordinates (Xa,Ya), where the origin G of the coordinate system X=Y=0 is defined as the intersection point of the optical axis and the scanning plane 400 such that Xa=−Xb, and Xa>0.

The following expressions describe the mirror coordinates in terms of the corresponding imaged field point:

$$Yc=(Ya+Yb)/2$$

$$\alpha=Arctan[(Ya-Yb)/(2Xa)]$$

In the above formulae:

Yc=Scanning mirror pivot axis height from the optical axis;

Ya=Detector height from the optical axis;

Yb=Height of a scanning image point on the focal length;

α=The angle between the scanning mirror plane to the focal plane; and

2Xa=The distance between the focal plane to the detector.

The location or focal length of the lens 100 does not affect the positioning of the scanning mirror. The lens can therefore be exchanged as a function of application. The scanning field of view coverage is preferably designed so as to cover the respective fields of view of alternative lenses.

The translational scanning rate does not depend on the corresponding field point:

$$dYc/dYb=\tfrac{1}{2}$$

Translation may be provided by relatively simple means, such as a motor with constant translatory motion.

The rotational scanning rate depends on the corresponding field point:

$$d\alpha/dYb=-2Xa/(4Xa^2+(Ya-Yb)^2)$$

The locus of points denoted by curve 700 represents the perpendicular distance P from the mirror point E to the scanning plane 400. The point E and the mirror pivot axis 310 displaced a distance L apart. Hence, the distance P can be described as a function of the mirror angle and the constant distance L as follows:

$$P=L*Sin\ \alpha$$

In the above formula:

P=The distance from the scanning plane to a point E on the mirror plane;

L=The distance from the scanning mirror pivot point to point E on the mirror plane; and α=The angle between the scanning mirror plane to the focal plane.

Figure 2:
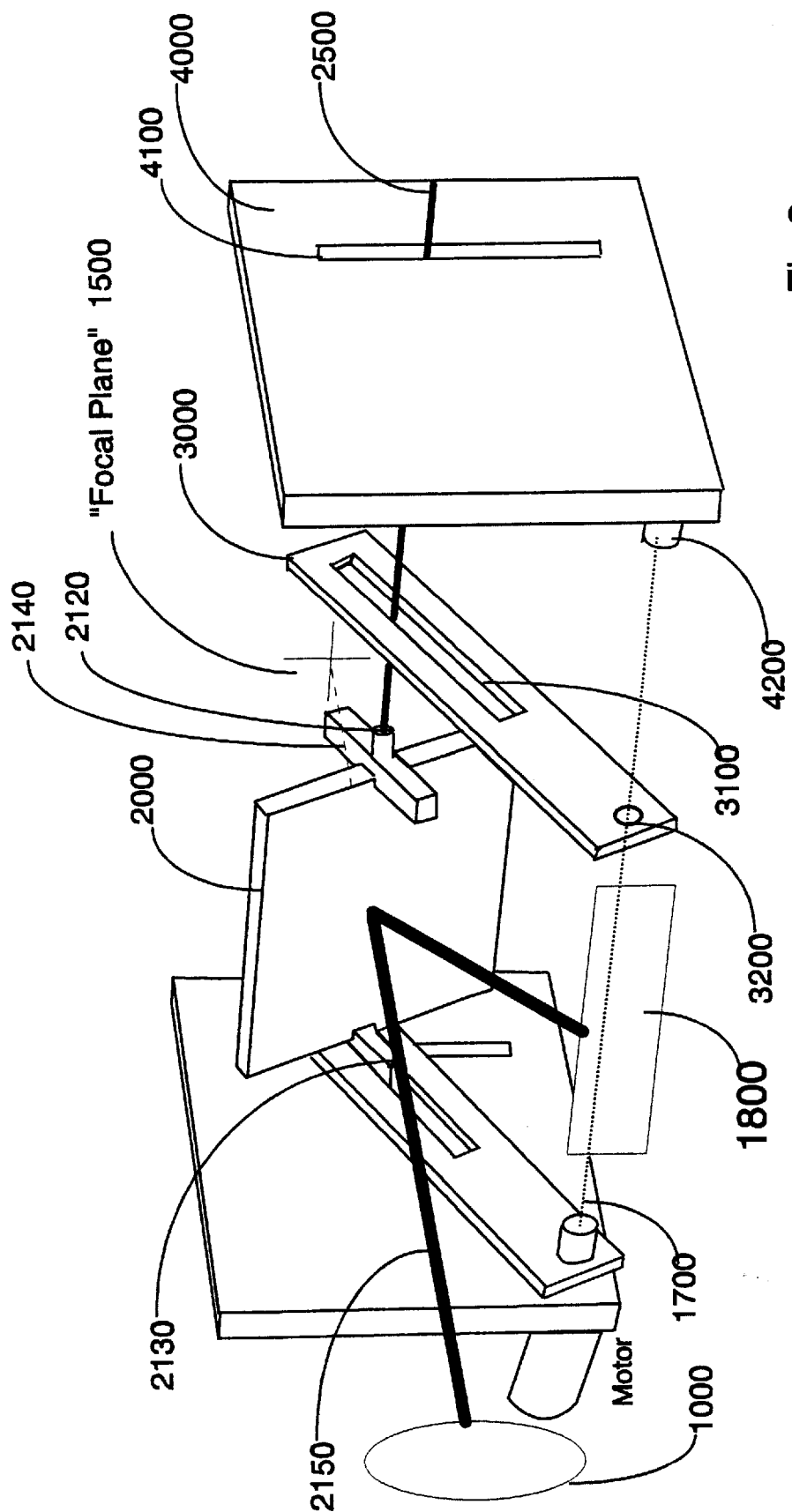
FIG. 2 is a simplified exploded isometric view of apparatus for providing simultaneous rotation and translation of a mirror which is constructed and operative in accordance with a preferred embodiment of the present invention.

Reference is now made to FIG. 2 which illustrates apparatus for providing simultaneous rotation and translation of a mirror which operates according to the method of FIGS. 1A–1B. The three main elements of the scanning system comprise a mirror unit 2000, leader unit 3000 and housing unit 4000.

The mirror unit 2000 includes, centered at the pivot point of the mirror, round pivot pins 2110 and 2120, and rectangular shafts 2130 and 2140, on both sides of the mirror pivot. The rectangular shafts are perpendicular to the plane of the mirror 2000.

The distance between the focal plane 1500 of the lens 1000 to the mirror pivot axis 2500 is equal to the distance between the mirror pivot axis 2500 to the detector axis 1700 which is also used as the pivot axis of the leader unit 3000. Unit 1800 is an imaging device which may, for example, comprise a one-dimensional photosensitive element such as a CCD linear array.

Leader unit 3000 includes a secondary rectangular leader 3100 which receives the rectangular shaft 2140 of the mirror. The leader 3100 is aligned perpendicularly with respect to the rotational axis 3200 which is also the detector axis 1700. Round pivot pin 2120 of the mirror unit 2000 is further received into leader 4100 of the housing unit 4000. Leader 4100 defines the scanning plane 400 in FIG. 1, and is aligned with the focal plane 1500 and the plane of the lens 1000. Rotational axis 4200 is aligned with axis 3200 of the leader unit and the detector axis 1700.

When leader unit 3000 is rotated about its rotation axis 3200, the round pivot pin 2120 which is located in leader 4100 of the housing unit 4000 is confined to the scanning plane 400 of FIG. 1. As the pivot pin 2120 moves within the leader 4100, the rectangular shaft 2140 moves along the leader 3100 of leader unit 3000 such that the reflective surface 2000 of the mirror maintains perpendicularity with respect to the detector axis 1700 which includes the rotation axis 3200 and the mirror pivot axis 2300.

Figure 3A:
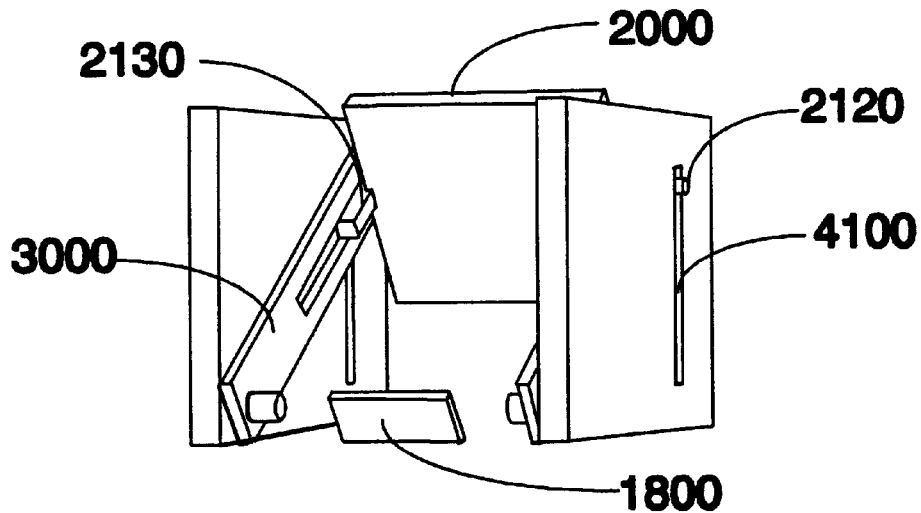
FIGS. 3A–3C are simplified isometric views of the apparatus of FIG. 2 in three different operative positions.
Figure 3B:
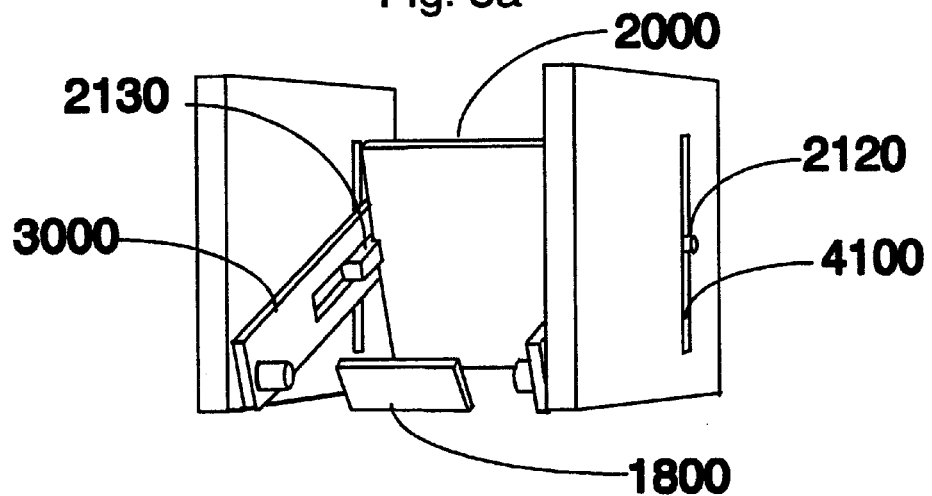
Figure 3C:
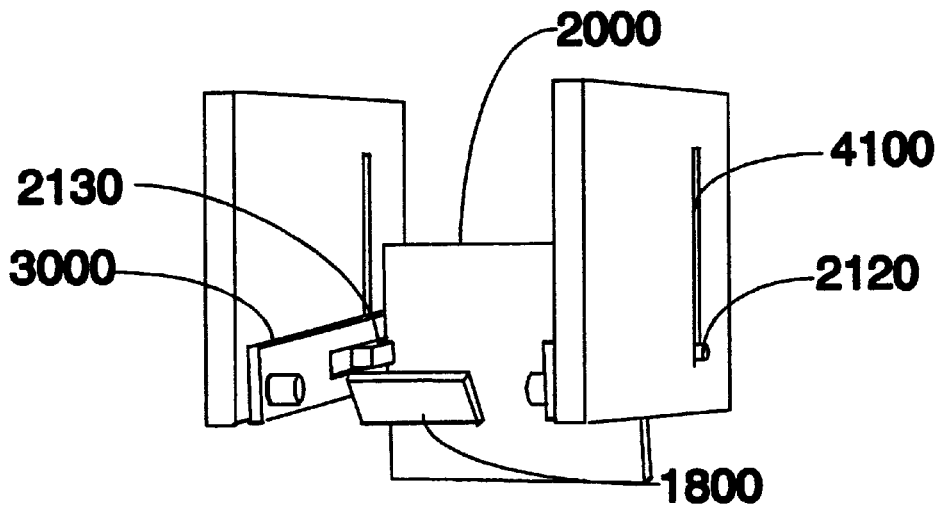

FIGS. 3A–3C illustrate the apparatus of FIG. 2 in three respective positions. Specifically, the scanning mirror is shown in two end positions in FIGS. 3A and 3C respectively and in an intermediate position in FIG. 3B.

FIG. 4 illustrates the apparatus of FIGS. 2–3C assembled together with an imaging lens and imaging detector in a camera housing.

Figure 5A:
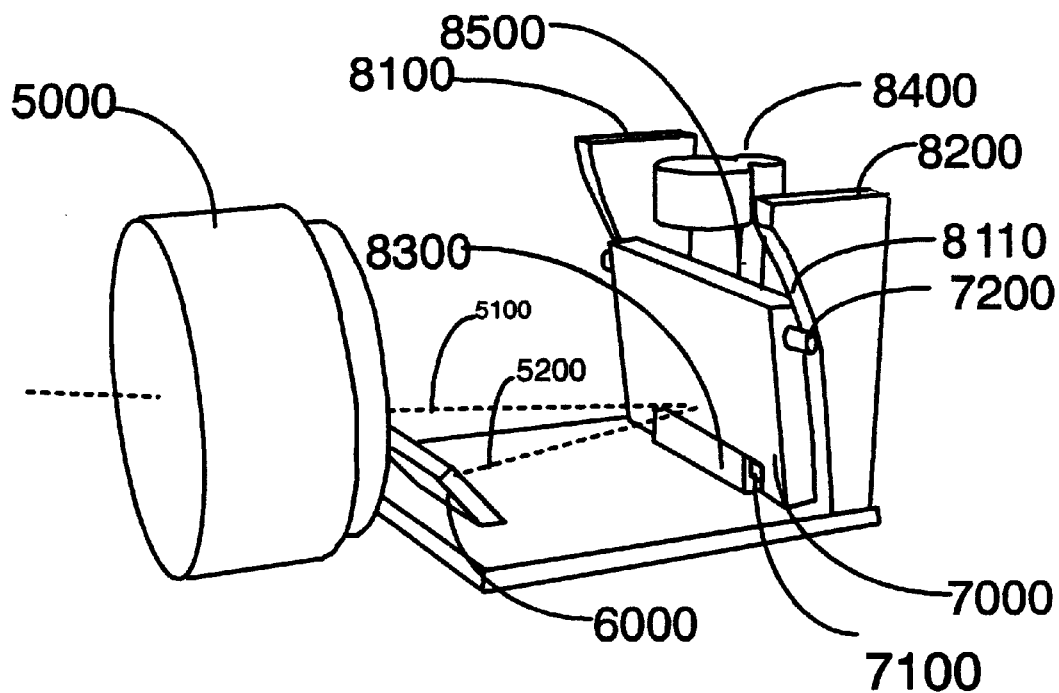
FIGS. 5A–5B is a simplified isometric view of apparatus for providing simultaneous rotation and translation of a mirror constructed and operative in accordance with another preferred embodiment of the present invention.
Figure 5B:
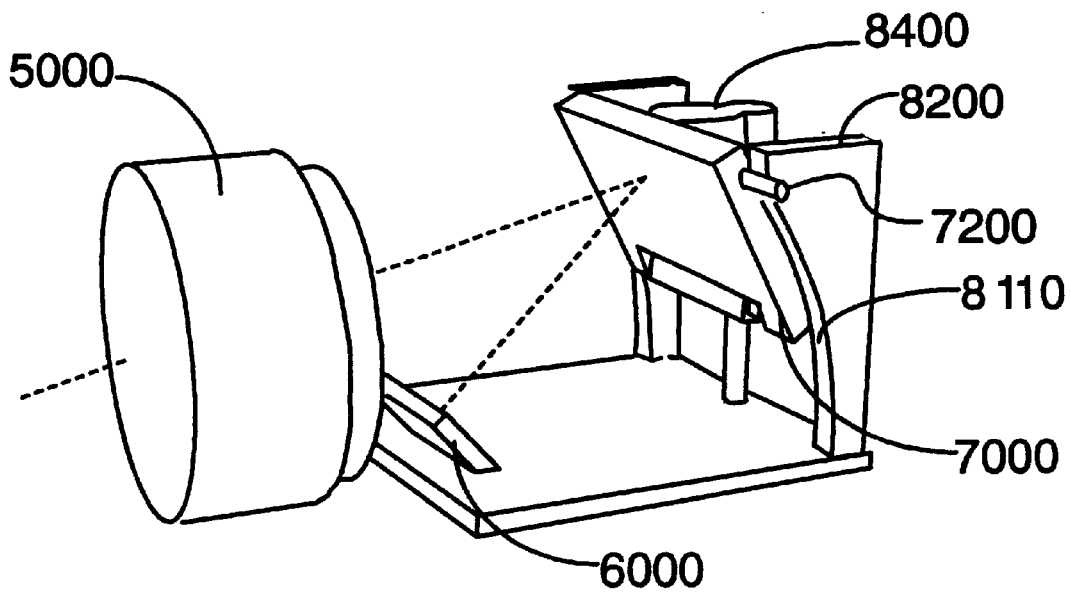

FIG. 5 illustrates another preferred embodiment of the present invention. Lens unit 5000 defines the optical axis of the system. Mirror unit 7000 rotates about an axis 7100 which is connected to a translation stage 8300. Translation stage 8300 is linearly translated perpendicular to the optical axis by a motor 8400. At a given distance from the rotational axis 7100, a pin 7200 is connected to the mirror. This pin follows a curved cam 8110 which is placed on either or both sides of the mirror 7000. Preferably, this curved motion is provided by a spring pressing the pin 7200 on the curved cam 8110. The curved cam 8110 is configured and arranged so as to provide the combined translational and rotational mirror motion described in FIGS. 1A–1B.

The scanning apparatus and methods disclosed herein is useful in both input and output scanners for electronic image handling. The apparatus is advantageous in that field of scanning is provided without the need for non-uniform motion of the translation axis of the scanning mirror therefore resulting in relatively inexpensive apparatus. Moreover, by adding a light source via a beam splitter next to the image sensor, the contrast and signal to noise of the scanned image may be enhanced.

The scanning apparatus disclosed herein is also useful in scanning documents, including face-up and face-down bound material such as magazines and books, and in scanning three dimensional objects, since it uses conventional imaging lenses.

The scanning apparatus disclosed herein is additionally useful in microscopy applications, for example in replacing conventional CCD video cameras which are attached to the optical setup, and whose field of view is often limited.

The scanning apparatus described herein is further useful when linear detector arrays for wide field of view low update rate coverage are used in combination with 2D imaging detector arrays for narrow field of view high update rates such as video rates in the case of CCD imagers. Such combined use of 1D and 2D imaging can be achieved by placing at the actual focal plane of the lens a 2D imaging array of detectors such as a video CCD array. Conventional imaging is achieved by translating the scanning mirror away from the lens' field of view. When wide field of view imaging is desired, the scanning mirror performs its translational-rotational motion using the 1D linear detector. Applications include microscopy, X-ray imaging and other various imaging applications.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. Optical scanning apparatus for scanning objects, comprising:

a focusing lens defining an optical axis and a focal plane;

a pivot axis;

a scanning mirror defining a scanning mirror plane and located between said focusing lens and said focal plane, wherein the scanning mirror is disposed parallel to the pivot axis and is rotatably attached thereto;

a detector located on a detector axis and wherein said detector axis is located between said focusing lens and said scanning mirror; and a mirror motion imparting device operative to translate said mirror such that said pivot axis is translated along a path parallel to the focal plane and to rotate the scanning mirror about the pivot axis as the pivot axis is translated such that said mirror plane at said pivot axis maintains substantially perpendicularity to said detector axis, thereby to scan an object.

2. Apparatus according to claim 1 wherein the pivot axis falls within the scanning mirror plane and wherein said mirror motion imparting device comprises:

a primary leader arranged in parallel to said focal plane;

an elongate member disposed in a fixed perpendicular orientation relative to said scanning mirror at said pivot axis;

a pin connected to said scanning mirror at said pivot axis; and a pin sliding device operative to slide said pin back and forth along said primary leader.

3. Apparatus according to claim 2 wherein said pin sliding device comprises a motor.

4. The optical scanning apparatus of claim 3 and also comprising a secondary leader within which said elongate member is seated and wherein, in response to said pin sliding along said primary leader:

said elongate member slides simultaneously along said secondary leader; and said secondary leader rotates about a secondary leader axis which is parallel to said scanning mirror axis and which is located between said focusing lens and said scanning mirror.

5. The optical scanning apparatus of claim 2 and also comprising a secondary leader within which said elongate member is seated and wherein, in response to said pin sliding along said primary leader:

said elongate member slides simultaneously along said secondary leader; and said secondary leader rotates about a secondary leader axis which is parallel to said scanning mirror axis and which is located between said focusing lens and said scanning mirror.

6. Apparatus according to claim 1 and wherein said detector is a photosensitive device.

7. Apparatus according to claim 1 and also comprising:

a light source; and a beam splitter operative to split beams between said detector and said light source.

8. A method for optically scanning objects, the method comprising:

providing a scanning mirror defining a scanning mirror plane located between a focusing lens and a focal plane, wherein the scanning mirror is disposed parallel to a pivot axis and is rotatably attached thereto;

positioning a detector on a detector axis located between said focussing lens and said scanning mirror;

translating said mirror such that said pivot axis is translated along a path parallel to the focal plane; and rotating the scanning mirror about the pivot axis as the pivot axis is translated such that said mirror plane at said pivot axis maintains substantial perpendicularity to said detector axis, thereby to scan an object located within the focussing len's field of view by maintaining a focussed image of a linear portion of the object on the detector throughout scanning of the object such that, for each position of the scanning mirror, a corresponding linear portion of the object is imaged, until the entire object has been imaged due to motion of the scanning mirror.

9. A method according to claim 8 and also comprising:

seating an elongate member, disposed in a fixed perpendicular orientation relative to said scanning mirror at said pivot axis within a secondary leader; and in response to a pin, connected to said scanning mirror at said pivot axis, sliding along a primary leader arranged in parallel to said focal plane:

sliding said elongate member simultaneously along said secondary leader; and rotating said secondary leader about a secondary leader axis which is parallel to said scanning mirror axis and which is located between said focusing lens and said scanning mirror.

10. A method according to claim 7 and also comprising providing a light source associated with said detector via a beam splitter.

* * * * *